United States Patent [19]
Dotson

[11] 3,793,163
[45] Feb. 19, 1974

[54] PROCESS USING ELECTROLYTE ADDITIVES FOR MEMBRANE CELL OPERATION

[75] Inventor: Ronald L. Dotson, Mentor, Ohio

[73] Assignee: Diamond Shamrock Corporation, Cleveland, Ohio

[22] Filed: Feb. 16, 1972

[21] Appl. No.: 226,934

[52] U.S. Cl. .................................. 204/98, 204/128
[51] Int. Cl. ............................................. C01d 1/06
[58] Field of Search .................. 204/98–99, 128, 204/258, 266, 130, 296, 90; 423/158, 140

[56] References Cited
UNITED STATES PATENTS
3,163,599  12/1964  Salutsky et al..................... 204/128

OTHER PUBLICATIONS
Handbook of Chemistry & Physics by Hodgman, Chemical Rubber Publish. Co., 1950, page 2806.

*Primary Examiner*—John H. Mack
*Assistant Examiner*—R. L. Andrews
*Attorney, Agent, or Firm*—Timothy E. Tinkler

[57] ABSTRACT

The operation of electrolytic cells employing a permselective cation-exchange membrane is improved by addition to the anolyte of a compound capable of forming, at an elevated pH, an insoluble reversible gel with any polyvalent cations present. The use of monobasic phosphates to combine with hardness ions is exemplary.

9 Claims, No Drawings

PROCESS USING ELECTROLYTE ADDITIVES FOR MEMBRANE CELL OPERATION

BACKGROUND OF THE INVENTION

Halogens and alkali metal hydroxides are routinely produced by passing an electric current through an alkali metal halide solution between an anode and an opposed cathode. In one such method of operation, a permselective cation-exchange membrane, conductive under cell conditions, is disposed between the electrodes, effectively dividing the cell or cell unit into separate anolyte and catholyte compartments. In such operation the alkali metal halide solution is fed to the anolyte compartment wherein it dissociates, the halide being converted into halogen gas at the anode while the alkali metal ions are selectively transported, often together with water, through the membrane into the catholyte compartment wherein said alkali metal ions combine with hydroxide ions, generated at the cathode by the electrolysis of water, to produce an alkali metal hydroxide solution. The primary advantage of a membrane cell operation is that both anions (e.g., halides) and polyvalent cations, usually present in the halide solution as contaminants (e.g., calcium, iron, nickel, magnesium, nickel, etc.), are excluded from the catholyte compartment resulting in an alkali metal hydroxide solution of a high degree of purity, as compared to the product of a more conventional (asbestos) diaphragm cell.

Commercialization of membrane cells has been hindered by their observed tendency to slowly increase in voltage during operation and by the membrane's susceptibility to distortion and deterioration. It has now been found that these problems are at least partially caused by the presence in the anolyte of polyvalent cations, which cations lead to a number of problems. To begin with, these polyvalent cations penetrate into the membrane itself and become attached to the cation-exchange sites, thereby decreasing the membrane's ability to transport monovalent alkali metal ions (together with the associated water). Further, a pecularity of membrane cell operation has been noted in that at the anolyte-membrane interface there exists an area of relatively high pH, on the order of 12 or more, apparently occasioned both by a back-migration of hydroxide ions through the membrane from the catholyte compartment and hydroxide generated by the dissociation of water at said anolyte-membrane interface owing to polarization of the membrane. The result of this phenomena is that the polyvalent cations, for example calcium, precipitate both at the membrane surface and within the pores (voids) thereof as insoluble calcium hydroxide and carbonate, resulting in an effective plugging of the membrane. As these generally crystalline deposits build up, splitting and rupturing of the membrane has been noted.

Obviously these occurrences are undesirable, both for the voltage increase occasioned by the increased resistance of the membrane through plugging with insoluble compounds and for the decrease in current density which follows the reduced ability of the membrane to transport sodium ions owing to a lesser number of available exchange sites and a reduction in the membrane's void volume.

STATEMENT OF THE INVENTION

Therefore, it is an object of the present invention to prevent the exchange of polyvalent cations by a permselective cation-exchange membrane employed for the electrolysis of an alkali metal halide solution.

It is another object of the present invention to prevent the deposition, upon and within a permselective cation-exchange membrane, of crystalline polyvalent cation-based compounds, insoluble at the elevated pHs existent at the anolyte-membrane boundry and within the membrane.

It is a further object of the present invention to prevent a decrease in the current efficiency of an electrolytic cell employing a permselective cation-exchange membrane in the electrolysis of an alkali metal halide solution, said decrease normally being attributed to the presence of polyvalent cations in the halide solution.

It is a still further object of the present invention to prevent an increase in the voltage of an electrolytic cell employing a permselective cation-exchange membrane, said increase normally being occasioned by the precipitation of insoluble polyvalent cation-based compounds within and upon the membrane.

These and further objects of the present invention will become apparent to those skilled in the art from the specification and claims which follow.

There has now been found, in an electrolytic cell containing an anode, a cathode and divided into anolyte and catholyte compartments by a conductive permselective cation-exchange membrane, a method of improving the electrolysis of an aqueous alkali metal halide solution containing polyvalent cations, which method consists essentially of adding to the alkali metal halide solution a compound capable of forming, at a pH of greater than 5.5 an insoluble gel with said polyvalent cations, said gel being reversible at a pH of less than 3.0, whereby a loss of current efficiency and plugging of the membrane with attendant increase in voltage is prevented. The additive compound is one capable of preferentially forming a reversible gel with the polyvalent cations, to the exclusion of macro-crystalline polyvalent metal hydroxides and carbonates, and is selected from the group consisting of free acid and alkali metal phosphates, othophosphates and metaphosphates. It has further been found that the reversible nature of the gel formed facilitates in situ cleaning of the membrane after long periods of operation in that by reducing the pH of the anolyte, either on shutdown or under load, the gel is dissolved and the resultant concentrations of sequestered polyvalent cations may be flushed from the cell.

By such operation significant advantages are realized. Current and voltage efficiencies remain at optimum high levels during extended periods of operation since unsequestered polyvalent cations do not reach the membrane. In fact, it has been observed that formation of the highly hydrated gel, which is itself a better medium for ionic and solvent transport than the alkali metal halide solution, often results in a measurable voltage reduction.

The problem of hydroxide back-migration, that is transport of OH$^-$ from the catholyte to the anolyte compartments through the membrane with the resultant formation of undesirable hypochlorites and chlorates in the anolyte, is also reduced since any hydroxide being so transported is incorporated into the gel both aiding in the formation of same and removing the hydroxide from availability for the chlorate-forming reaction. A phosphate-based gel also assists in keeping the catholyte chloride-free since the electrostatic charge on the phosphate radicals is even higher than, and augments, the charge on the (usually) sulfonic acid groups of the cationic membrane, thereby more effectively repulsing negative chloride ions.

An interesting and advantageous property of the gels is that they, being reversible, require a relatively high pH for their existence in an insoluble, or "quasi-solid," form. Therefore, although the gel readily forms at the membrane-anolyte interface, a region of high pH, as it builds up and approaches the anode its thickness becomes self-regulating since the acidity attendant the anode causes the gel in that region to dissolve or be prevented from forming.

DESCRIPTION OF THE PREFERRED EMBODIMENTS

The membrane cell operation to which the present invention applies is conventional and operational details do not affect the comparative effectiveness of the invention. Generally, an enclosure is provided and divided into two compartments by the membrane material. In one compartment, the catholyte compartment, is disposed an appropriate cathode, generally a metallic material, such as iron. The other compartment, the anolyte compartment, contains the anode — a conductive, electrolytically-active material, such as graphite or, more desirably, a dimensionally stable anode, e.g., a titanium substrate bearing a coating of a precious metal, precious metal oxide or other electrolytically active corrosion-resistant material. The anolyte compartment is provided with an outlet for generated halogen gas, an inlet for halide solution and an outlet for depleted halide solution. Similarly, the catholyte compartment will have outlets for liquid and gaseous products and, generally, an inlet through which water and/or hydroxide solution may be added.

In operation, alkali halide solution is fed to the anolyte compartment at the desired concentration and flow rate while the catholyte compartment is initially filled with water or an aqueous hydroxide solution. A direct current is then passed between the electrodes causing the generation of halogen gas at the anode and the selective transport of hydrated alkali metal ions across the membrane into the catholyte where they combine with hydroxide ions formed at the cathode by the electrolysis of water, hydrogen gas being liberated. Depending upon the rate of flow of water into the catholyte compartment, hydroxide solutions of varying concentrations may be produced.

All permselective cation-exchange membranes useful in the aforedescribed electrolysis of aqueous alkali metal halide solutions are beneficially affected by the process of the present invention. Generally speaking these membranes are sulfonated materials based upon a chemically resistant polymer backbone such as a divinylbenzene-acrylic acid copolymer, polyethylene, divinylbenzene-polystyrene copolymers, polyvinyl fluorocarbon ethers and the like. Particularly preferred at this time, because of their apparent superiority in a membrane cell of the type in question, are the membranes manufactured and sold by the E. I. duPont deNemours & Company under the trademark of XR perfluorosulfonic acid membranes, based upon a completely fluorinated vinyl ether polymer containing pendant sulfonic acid groups and having an equivalent weight within the range of 1,000–2,200 (grams of polymer per equivalent of proton) and a gel water content within the range of 15–40 percent. Thus, generally, a useful membrane comprises a chemically and mechanically resistant polymer matrix or backbone to which are attached, in an extremely stable fashion, highly electronegative groups, such as sulfonic, phosphonic or carboxylic acids. The desired high degree of electrical conductivity and high apparent alkali metal ion transport number are contingent upon the presence in these membranes of considerable quantities, generally in excess of 15 weight percent on a dry resin basis, of gel water. A further understanding of these membranes and examples thereof may be found by reference to U. S. Pat. Nos. 2,636,851; 3,017,338; 3,496,077; 3,560,568; 2,967,807; 3,282,875 and British Patent 1,184,321.

As indicated above, the additives useful in the practice of the present invention are those capable of forming "insoluble reversible gels" with polyvalent cations at pH's in excess of 5.5. The term "insoluble" is intended to indicate that under cell conditions and at the indicated pH, a gelatinous, quasi-solid precipitate, porous in nature and containing large quantities of bound water, is formed and maintained. "Reversibility" refers to the fact that, at a pH on the order of 3.0 or less the gel is converted to a completely soluble hydrophilic sol. The formation of a true gel, that is, a highly hydrated precipitate, is important to the invention since many of the advantages accrue from the fact that the quasi-solid gel acts as a secondary membrane, improving the selective transportation of ions. Compounds capable of forming such gels are numerous. Particularly preferred at this time, by reason of their economy, resistance to halogens and selective ability to "sequester" the polyvalent cations, are the various free acid and alkali metal phosphate, orthophosphate and metaphosphate materials. Preferably, for obvious reasons, these phosphates are added as an alkali metal salt corresponding to the alkali metal halide being subjected to electrolysis.

It should be understood that the amount of additive employed will vary with a number of considerations, primarily the degree of polyvalent cation contamination of the alkali metal halide solution. Generally, the invention contemplates the continuous addition of from 1–500 parts per million of gel-forming anions to the halide solution. Of course somewhat larger amounts may be used, but without apparent further beneficial effect. In fact, amounts of additive anions in excess of 1000 p.p.m. have been observed to have a detrimental effect on current efficiency.

Since, as is pointed out hereinabove, the formation of the gel results in advantages, operationally speaking, other than a mere prevention of plugging of the membrane (for example, an improved transport of ions), the invention also contemplates, in the case where the halide solution being treated is of exceptional purity or in the initial operation of a cell where a buildup of polyvalent cations has not yet occurred, the deliberate addition to the alkali metal halide solution of polyvalent cations capable of forming the desired gel. Thus, it may be desirable to add small amounts of calcium chloride, for example, to the alkali metal halide solution or to employ, rather than an alkali metal phosphate, an alkaline earth phosphate. Other polyvalent cations, such as the transition metals, e.g., titanium, vanadium, chromium, manganese, iron, cobalt, nickel, copper, zinc and particularly aluminum owing to the amphoteric nature of the gel formed, are also contemplated.

For various reasons it may be desirable to periodically clean the gel from the membrane. This is readily accomplished by lowering the pH of the anolyte or, during an operational shutdown, flusing the anolyte compartment, and hence the membrane, with an acid solution. Such acidity is in no way detrimental to the membrane itself. Once the acid condition is removed and addition of the gel-forming anions resumed, a new gel layer will form with its attendant advantages.

In order that those skilled in the art may more readily understand the present invention, the following specific example is afforded.

EXAMPLE

A saturated aqueous brine (NaCl) solution having a pH of 2.6 and a hardness value, calculated as $Ca^{++}$, of about 20 p.p.m. is fed to the anode compartment of an electrolytic cell employing a steel mesh cathode, an expanded titanium anode bearing a $2TiO_2{:}RuO_2$ mole ratio coating on the surface thereof and a duPont XR cation-exchange membrane as described above and having a thickness of 10 mils and an average gel water content of about 25 percent. The catholyte initially consists of a 36 percent sodium hydroxide solution. After operation is begun the only source of influent to the catholyte compartment is through the membrane. An anode current density of 1.0 ampere per square inch is employed, a cell temperature in the range of 85° to 95°C. is maintained and brine is fed to the anolyte compartment at the rate of 1 milliliter per ampere minute. The cell is allowed to reach equilibrium and is continued in operation for a number of days at which time the current efficiency is measured at only 59 percent with a caustic concentration of 46.5 percent. At this point addition to the brine is begun of 0.02 grams per liter (20 p.p.m.) of $NaH_2PO_4$. Within 8 hours the current efficiency has climbed to 70 percent at the same caustic concentration. Operation is continued for seven days with a final current efficiency of 76 percent being noted.

On disassembly of the cell the membrane is found to be coated with a gelatinous layer (which when dried and analyzed is found to consist primarily of $Ca_5(PO_4)_3OH$), easily removed, by washing with a dilute hydrochloric acid solution leaving an unaffected membrane. A like membrane without the use of an additive is covered and impregnated with hard white crystalline deposits which have hindered operation and caused blistering and rupturing of the membrane. Such a membrane cannot be restored to its original appearance or performance even upon prolonged washing with acid solutions.

The foregoing experiment is repeated three times employing $NaH_2PO_4$, $Na_2HPO_4$ and $Na_3PO_4$ (200 p.p.m.) as the additives with substantially identical results.

While the invention has been described by reference to certain preferred embodiments thereof, it is not to be so limited since changes and alterations may be made therein which remain within the full and intended scope of the appended claims.

I claim:

1. In an electrolytic cell containing an anode, a cathode and divided into anolyte and catholyte compartments by a conductive permselective cation-exchange membrane, a method of improving the electrolysis of an aqueous alkali metal halide solution containing polyvalent cations selected from the group consisting of alkaline earth and transition metal cations, which method consists essentially of adding to the alkali metal halide solution and introducing to the anolyte compartment a compound capable of forming, at a pH of greater than 5.5, an insoluble gel with said polyvalent cations, said gel being reversible at a pH of less than 3.0, whereby a loss of current efficiency and plugging of the membrane with attendant increase in voltage are prevented.

2. A method as in claim 1 wherein the alkali metal halide is sodium chloride and the polyvalent cations are predominantly calcium and magnesium.

3. In an electrolytic cell containing an anode, a cathode and divided into anolyte and catholyte compartments by a conductive permselective cation-exchange membrane, a method of improving the electrolysis of an aqueous alkali metal halide solution containing polyvalent cations selected from the group consisting of alkaline earth and transition metal cations, which method consists essentially of adding to the alkali metal halide solution and introducing to the anolyte compartment a compound selected from the group consisting of free acid and alkali metal phosphates, orthophosphates and metaphosphates, said compound and cations being capable of forming an insoluble gel at a pH of greater than 5.5, said gel being reversible at a pH of less than 3.0, whereby a loss of current efficiency and plugging of the membrane with attendant increase in voltage are prevented.

4. A method as in claim 3 wherein the alkali metal halide is sodium chloride and the polyvalent cations are predominantly calcium and magnesium.

5. In an electrolytic cell containing an anode, a cathode and divided into anolyte and catholyte compartments by a conductive permselective cation-exchange membrane, a method of improving the electrolysis of an aqueous alkali metal halide solution, which method consists essentially of adding to the alkali metal halide solution and introducing to the anolyte compartment polyvalent cations, and anions capable of forming an insoluble gel with said polyvalent cations at a pH of greater than 5.5, said gel being reversible at a pH of less than 3.0, whereby an improvement in current efficiency and voltage is obtained.

6. A method as in claim 5 wherein the alkali metal halide is sodium chloride.

7. In an electrolytic cell containing an anode, a cathode and divided into anolyte and catholyte compartments by a conductive permselective cation-exchange membrane, a method of improving the electrolysis of an aqueous alkali metal halide solution, which method consists essentially of adding to the alkali metal halide solution and introducing to the anolyte compartment a compound selected from the group consisting of alkaline earth and transition metal phosphates, metaphosphates and orthophosphates, whereby there is formed a gel insoluble at a pH of greater than 5.5 and reversible at a pH of less than 3.0 and an improvement in current efficiency and voltage are obtained.

8. A method as in claim 7 wherein the alkali metal halide is sodium chloride.

9. In an electrolytic cell divided into anolyte and catholyte compartments by a conductive, permselective, cation-exchange membrane, a method of preventing plugging of said membrane during electrolysis of an alkali metal halide solution contaminated with polyvalent cations selected from the group consisting of alkaline earth and transition metal cations, which method consists essentially of adding to the halide solution and introducing to the anolyte compartment a soluble compound capable of forming an insoluble gel with said polyvalent cations at a pH of greater than 5.5 and periodically dissolving at least a portion of said gel by reducing the pH of the anolyte to below 3.0 and flushing the concentrated polyvalent cations from the anolyte compartment.